United States Patent
Steenhoek

(10) Patent No.: US 9,677,942 B2
(45) Date of Patent: Jun. 13, 2017

(54) SYSTEM AND METHOD FOR MEASURING COLOR USING LOCATION AND ORIENTATION SENSORS

(71) Applicant: AXALTA COATING SYSTEMS IP CO., LLC, Wilmington, DE (US)

(72) Inventor: Larry E. Steenhoek, Wilmington, DE (US)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 0 days.

(21) Appl. No.: 14/528,600

(22) Filed: Oct. 30, 2014

(65) Prior Publication Data

US 2016/0123815 A1   May 5, 2016

(51) Int. Cl.
  *G01J 3/46* (2006.01)
  *G01J 3/50* (2006.01)
(52) U.S. Cl.
  CPC .............. *G01J 3/463* (2013.01); *G01J 3/504* (2013.01); *G01J 2003/467* (2013.01)
(58) Field of Classification Search
  CPC ....................................................... G01J 3/463
  USPC ........................................................ 356/402
  See application file for complete search history.

(56) References Cited

U.S. PATENT DOCUMENTS

| | | | | |
|---|---|---|---|---|
| 4,479,718 A | * | 10/1984 | Alman | G01J 3/504 356/405 |
| 4,917,495 A | * | 4/1990 | Steenhoek | G01J 3/0251 356/328 |
| 5,231,472 A | * | 7/1993 | Marcus | G01N 21/4738 356/402 |
| 5,929,998 A | * | 7/1999 | Kettler | G01J 3/46 356/405 |
| 6,522,977 B2 | | 2/2003 | Corrigan et al. | |
| 6,539,325 B1 | * | 3/2003 | Numata | G01J 3/46 356/402 |
| 7,145,656 B2 | | 12/2006 | Rodrigues et al. | |
| 2006/0114465 A1 | * | 6/2006 | Hart | G01J 3/02 356/445 |
| 2007/0292608 A1 | * | 12/2007 | Rodrigues | G01J 3/46 427/140 |
| 2009/0157212 A1 | * | 6/2009 | McClanahan | G01J 3/463 700/107 |
| 2011/0160892 A1 | * | 6/2011 | Kettler | G01J 3/463 700/105 |

* cited by examiner

*Primary Examiner* — Tarifur Chowdhury
*Assistant Examiner* — Omar Nixon
(74) *Attorney, Agent, or Firm* — Lorenz & Kopf, LLP

(57) ABSTRACT

A system and method is provided for measuring and storing the paint color formula of a sample. Paint is sprayed on directional samples. The horizontal standard is measured and stored in a database. A vertical standard is measured at a plurality of locations and orientations and stored in the database.

6 Claims, 7 Drawing Sheets

SYSTEM AND METHOD FOR MEASURING COLOR USING LOCATION AND ORIENTATION SENSORS

TECHNICAL FIELD

Embodiments of the subject matter described herein relate generally to color measurement and, more particularly, to a system and method for measuring color while recording the orientation of a color measuring device such as a goniospectrophotometer.

BACKGROUND

Various color matching techniques have been developed in the past to aid in the selection of the correct matching coating composition to refinish a vehicle, but all suffer from certain significant limitations. For instance, visual tools such as refinish color chips have been used on many occasions to find a suitable match for the vehicle that needs refinishing. However, visual color matching is time-consuming, cumbersome, and subject to many errors as a result of poor lighting conditions, operator variances, and/or variation from the original standard by the paint manufacturer. Another system involves the use of vehicle data, such as its make, model year, and manufacturer's paint code. The vehicle data is used to identify the corresponding coating formulas associated with that paint code.

A further system commonly employed involves the use of a computer controlled colorimeter or spectrophotometer which measures the color values of an undamaged area of the coating on the vehicle and compares these color values to those stored in a database that contains color data for various refinish matching coatings and corresponding matching formulas. From that comparison, the computer locates one or more preliminary matching formulas for the vehicle's original coating color and appearance within an acceptable tolerance. An example of such a method is described in U.S. Pat. No. 7,145,656, entitled "Computer-implemented Method For Matching Paint", issued Dec. 5, 2006. This method, however, requires measured color values and cannot identify matching formulas based on vehicle identification information.

An even further development is to use both the measured color values and vehicle identifying information to locate potential preliminary matching formulas from a refinish matching coating database. One example of such a system is described in U.S. Pat. No. 6,522,977, entitled "Computer-implemented Method And Apparatus For Matching Paint." In this system, sample coatings resulting from each of the preliminary matching formulas are prepared and test sprayed. Color match is then visually determined. In most cases, the preliminary matching formulas need to be adjusted manually and repeatedly by trial and error until a match is achieved.

It is known that effect pigment flake orientation is an important contributor to the color and appearance of gonioapparent paint materials. The orientation of the flakes is not always isotropic with respect to a specimen being rotated in its own plane. The process of spraying paint on a vertical surface in the earth's gravitational field may result in preferential orientation, a phenomenon sometimes referred to as the "venetian blind effect". Such anisotropic specimens are said to be "directional". This anisotropy is often evidenced by a change in color measurements as the specimen is rotated about its normal surface thus presenting a challenge for vehicle finish repair operations because it is difficult to accurately match the color; i.e. it is difficult to determine the appropriate paint formula that accurately reflects the paint on the vehicle.

When a paint repair is made to a vehicle, a color measuring device such as a goniospectrophotometer, also known as a multi-angle spectrophotometer, is often used to measure the color of the vehicle. The color data obtained from this process is used to select a repair paint formula that will provide the best color match. If the paint on the vehicle is "directional" (i.e. typically a vertical surface), the rotational orientation of the goniospectrophotometer relative to the paint surface normal may have an effect on the appropriate paint formula to select. Currently, color measurement instructions include a description of the proper orientation of the goniospectrophotometer; however, the proper orientation cannot be verified from the measurement data, and without proper orientation, the paint formula selected for repair may not provide an optimal color match. Previous attempts to assure proper orientation are inherently unreliable since there was no known way to confirm proper instrument orientation. Therefore, instrument orientation has not been used as part of the paint formula prediction and retrieval process. Presently there is no quick, easy, and inexpensive way to determine which aftermarket matching refinish coating composition is the best match in color and appearance for a particular OEM coating.

Thus, it would be desirable to provide a system and method for recording the orientation of a color measurement instrument such as a goniospectrometer at the time of vehicle manufacture and include this orientation information as metadata to the color measurement data for later use. It would further be desirable to utilize accelerometers or other orientation sensors in the goniospectrophotometer to record its three-dimensional orientation (i.e. roll, pitch, and yaw) so that an accurate paint formula can be determined and utilized at a later time for repair. It would still further be desirable to record the position (X,Y,Z) of the measurement spot relative to a reference point on the body of the vehicle to confirm the location on the vehicle where the measurement was made

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for measuring and storing color data. The color of a directional sample is measured with a color measuring device at a plurality of orientations relative to the orientation of the panel at the time of paint application, and the color and orientation data is stored in a database.

A method for measuring and storing the color of a vehicle is also provided wherein the paint is sprayed on the vehicle at the time of original vehicle manufacture. The color of a directional panel is measured with a color measuring device at a plurality of device orientations relative to the orientation of the panel at the time of paint application, and the color and orientation data is stored in a database.

Yet another method for measuring and storing the color of a vehicle is provided wherein paint is sprayed on vertical and horizontal samples by a paint manufacturer at the time of initial formulation of the paint. The color of a vertical sample is measured with a color measuring device at a plurality of orientations, and the color and instrument orientation data is stored in a database.

Another method is provided for measuring the color of a vehicle needing paint repair. The color of the vehicle is measured with a color measuring device at a plurality of orientations, the color data and orientation data is provided to a processor, and a database is searched to retrieve substantially matching paint formulas.

Also provided is a system for measuring and storing color data comprising at least one color measuring device, at least one orientation sensor coupled to the color measuring device, an input device, an output device, and a database. A processor is coupled to the database, the output device, the input device, and the color measuring device, for receiving and storing (1) a plurality of color measurements, each taken at a different measuring device orientation, and (2) corresponding color measuring device orientation data.

Furthermore, other desirable features and characteristics of the system and method will become apparent from the following detailed description and the appended claims, taken in conjunction with the accompanying drawings and the preceding background.

BRIEF DESCRIPTION OF THE DRAWINGS

Embodiments of the subject matter will hereinafter be described in conjunction with the following figures, wherein like numerals denote like elements, and.

DETAILED DESCRIPTION

Figure 1:
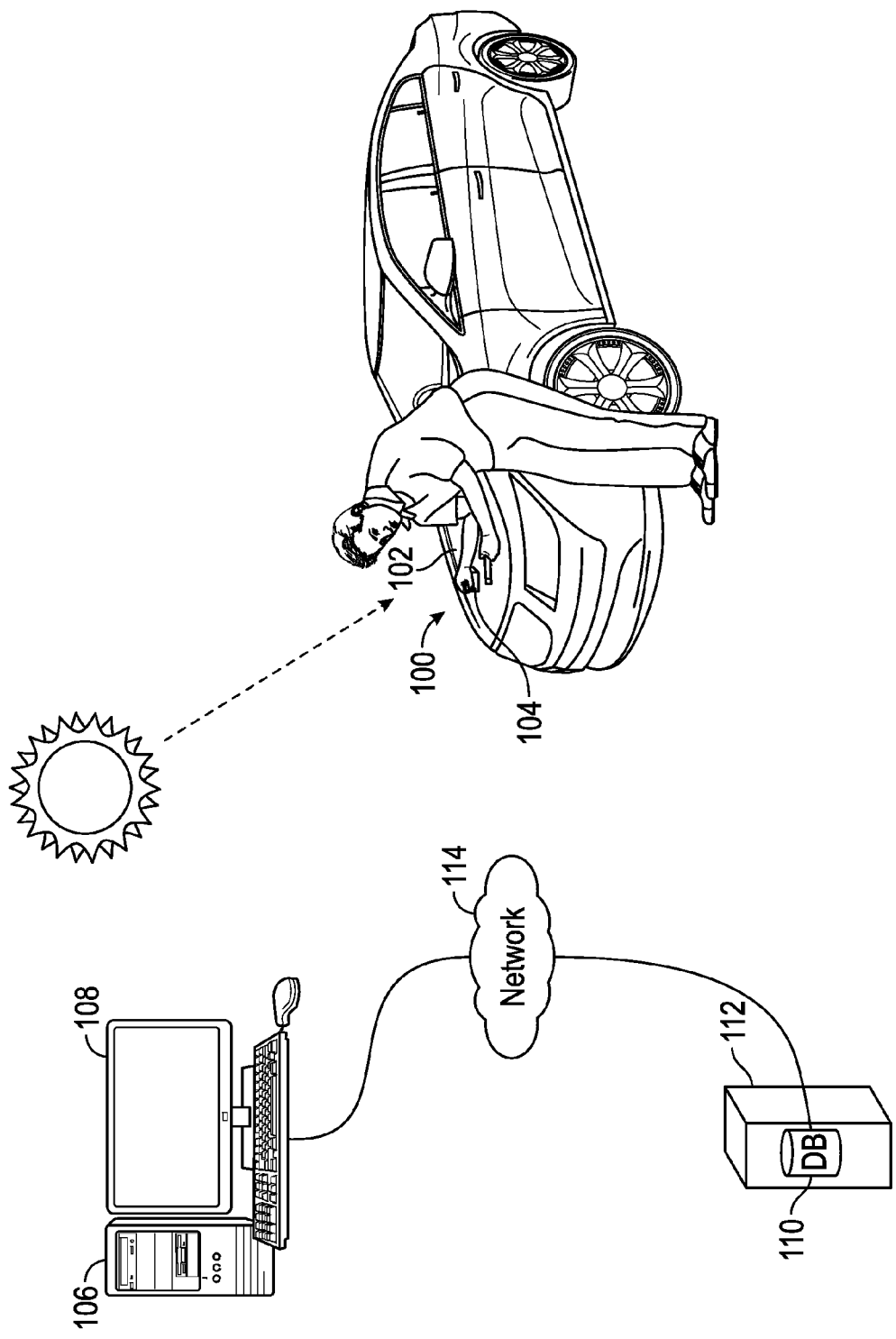
FIG. 1 is shown a simplified illustration of a vehicle having a painted surface, the color of which is being measured for the purpose of deriving a matching paint formula to effectuate a repair in accordance with the prior art.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, touchscreen displays, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Features and advantages will be more readily understood, by those of ordinary skill in the art, from reading the following detailed description. It is to be appreciated that certain features, which are, for clarity, described above and below in the context of separate embodiments, may also be provided in combination in a single embodiment. Conversely, various features that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein, the term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. Each of the terms "vehicle", "automotive", "automobile", "automotive vehicle", and "automobile vehicle" refer to an automobile such as car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport that are coated with coating compositions.

As used herein, a computing device refers to a desktop computer, a laptop computer, a pocket PC, a personal digital assistant (PDA), a handheld electronic processing device, a smart phone that combines the functionality of a PDA and a mobile phone, an iPod, an iPod/MP Player, or any other electronic devices that can process information automatically. A computing device may have a wired or wireless connection to a database or to another computing device. A computing device may be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A computing device may further be a sub-unit of another device. Examples of such a sub-unit can be a processing chip in an imaging device, or a goniospectrophotometer. A computing device may be connected to a display device, such as a monitor screen. A "portable computing device" includes a laptop computer, a pocket PC, a personal digital assistant (PDA), a handheld electronic processing device, a mobile phone, a smart phone that combines the functionality of a PDA and a mobile phone, a tablet computer, an iPod, an iPod/MP Player, or any other stand alone or sub-unit devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, Wi-Max device, local area network (LAN) device, 3G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

An imaging device refers to a device that can capture images under a wide range of electromagnetic wavelengths including visible or invisible wavelengths. Examples of the imaging device include, but not limited to, a still film optical camera, a digital camera, an X-Ray camera, an infrared camera, an analog video camera, and a digital video camera. A digital imager or digital imaging device refers to an imaging device captures images in digital signals. Examples of the digital imager include, but not limited to, a digital still camera, a digital video camera, a digital scanner, and a charge coupled device (CCD) camera. An imaging device can capture images in black and white, gray scale, or various color levels. Images captured using a non-digital imaging device, such as a still photograph, can be converted into digital images using a digital scanner. The imaging device can further comprise an illumination device that provided illuminations at a single or multiple angles.

A display device can be a computer monitor, a projector, a TV screen, a personal digital assistant (PDA) device, a cell phone, a smart phone that combines PDA and cell phone, an iPod, an iPod/MP Player, a flexible thin film display, or any other devices that can display information or images based on digital signals. The display device can also be a printing device that prints, based on digital signals, information or image onto papers, plastics, textiles, or any other surfaces that are suitable for printing the information or images onto. The display device can also be a duel functional display/data input device, such as a touch screen.

The term "repair formula" refers to a collection of information or instruction, based upon that, a repair composition can be prepared. A refinish coating formula is a typical example of the repair formula. A repair formula can also be a formula to repair small damage of a vehicle coating at some points of original manufacturing (OEM) production line wherein a refinish formula has not yet been developed for that particular vehicle.

Color data is obtained by measuring the paint sample using a color measuring device such as a goniospectrophotometer with at least one illumination and viewing geometry, e.g. illumination at 45 degrees and viewing at zero degrees relative to a direction perpendicular to the sample surface. Colors containing metallic or other flake pigments have color variation with directions of illumination and viewing. This color variation or color travel is characterized by color measurements at multiple illuminations and viewing geometries. The measurement geometries are described by the aspecular angle of the measurement geometry, i.e., the angle between the viewing and specular reflection directions (see American Society for Testing and Materials (ASTM), Standard Practice for Specifying the Geometry of Multiangle Spectrophotometers, Technical Report ASTM E2194.01 (2011)). For example, the Acquire Plus EFX™ manufactured by Byk-Gardner GMBH provides color measurements at 15, 45 and 110 aspecular angles to characterize color travel of colors. Color measurements are made as spectral reflectance measurements at each measurement geometry, and CIE colorimetry (Commission Internationale De L'Éclairage (CIE), Colorimetry, $3^{rd}$ ed., CIE 015: 2004, CIE Central Bureau, Vienna, 2004) is used to compute XYZ tristimulus values for daylight Illuminant D65 and the 1964 standard observer; however, other Illuminants and observers are possible. The tristimulus values are transformed to CIELAB (CIE 1976 L*a*b* color space) at aspecular directions 15, 45 and 110 for a total of 9 color data dimensions, which is the data provided in the color formula database. Since solid colors show little color travel variation with direction, L*a*b* values at aspecular angle 45 are used to define solid colors. For effect and tri-coat colors, L*a*b* at aspecular angles 15, 45 and 110 are used to define color. CIELAB L*a*b* values are used in a preferred embodiment to provide a uniform color space in which equal differences in any dimension produce approximately equal visual magnitude. It should be noted, however, that any color coordinates derived from CIE XYZ tristimulus measurements or any other numerical color specification system could be used for color description and chromatic sorting. It should be further noted that the color and appearance data set could be extended to different or additional directions, other color coordinate systems, or other appearance measurements.

The Byk Acquire plus EFX™ also provides measurements of Sparkle Grade at aspecular angles 15 and 45 (Sg15, Sg45) that correspond to the perceived sparkle appearance in those directions. These sparkle data values are likewise included in the color formula database. Solid colors are defined by a set of 3 color dimensions (i.e. L*45, a*45, and b*45) and effect or tri-coat colors are defined by 11 color and sparkle dimensions (i.e. L*15, a*15, b*15, L*45, a*45, b*45, L*110, a*110, b*110, Sg15, Sg45). As was the case above, the color and appearance data set may be extended to different or additional directions, additional color angles, sparkle angles, other color coordinate systems, or other appearance measurements.

Referring to FIG. 1, there is shown a simplified illustration of a vehicle 100 (e.g., an automobile) having a painted surface 102, the color of which is being measured using a goniospectrophotometer 104 for the purpose of deriving a matching paint formula to effectuate a repair as is well known in the art. Vehicle 100 is identified using data associated with the vehicle such as one or more of a vehicle identification number (VIN), year, make model, general color, or other data that may be stored in database 110 and used to identify color as is known to the skilled practitioner. This information is communicated to computer 106 which then searches database 110 to retrieve paint formulas associated with the vehicle information. Database 110 may be disposed on a server 112 remote from computer 106 for communication therewith via a network 114 such as, for example, the Internet.

Goniospectrophotometer 104 measures the visible reflectance factor spectra of the painted surface, or color coordinates derived from the visible reflectance factor spectrum of the painted surface, and provides this data to computer 106, which determines one or more paint formulas stored in database 110. The color data obtained from this process is used to select a repair paint formula that will provide the best color match. Computer 106 may be provided with a display 108 via which the paint formulas and colors may be provided. Display 108 is preferably a color display so that the paint formulas may be displayed in color. However, as stated previously, if the paint on the vehicle is "directional" (i.e. typically a substantially vertical surface), the rotational orientation of the goniospectrophotometer relative to the paint surface normal may have an impact on the paint formula selected. While color measurement instructions include a description of the proper orientation of the goniospectrophotometer, the proper orientation cannot be verified from the measurement data, and without proper orientation, the paint formula selected for repair may not provide an optimal color match. Previous attempts to achieve proper orientation are inherently unreliable; thus, there is no way to confirm proper instrument orientation. As a result, previous instrument orientation has not been used as part of the paint formula prediction and retrieval process, and since there was no known way to confirm proper instrument orientation, instrument orientation has not been used as part of the paint formula prediction and retrieval process. Presently there is no quick, easy and inexpensive way to determine which aftermarket matching refinish coating composition is the best match in color and appearance for a particular OEM coating.

Thus, the following describes exemplary embodiments of systems and methods for (1) recording the orientation of a color measurement instrument (e.g., a goniospectrophotometer) at the time of manufacture by an automotive OEM or (2) preparing alternate color formulas by a paint manufacturer, and including in each case the resultant data in a database as metadata to the color measurement data for later use; e.g., at a paint repair center.

In the first case (i.e. color measurements made at the time of OEM manufacture), color data may be recorded at the end of a vehicle manufacturing assembly line. Accelerometers or other orientation sensors are used in the goniospectrophotometer to record its original three-dimensional orientation (i.e. roll, pitch, and yaw) so that an accurate paint formula can be determined and utilized at a later time. The instrument that is being used to measure the color of a vehicle, is placed in a fixed position on an assembly line so that the instrument orientation and its position (X, Y, Z) relative to the assembly line can be used to confirm the location on the vehicle where the measurement was made. This is especially true in the case of a vertical panel where gravitational effects have an impact on the measurements; i.e. there may be different readings for different directional orientations of the color measuring device. When a measurement is taken on a horizontal surface, the readings are relatively independent of the orientation of the instrument due to the relative lack of gravitational influence.

As stated previously, paint manufacturers may also produce alternate paint formulas and store them in a database for subsequent use in a paint repair scenario. In this case, paint is sprayed on substantially horizontal and vertical panels and corresponding color measurements are taken and stored in the database. These measurements may exhibit similar gravitational effects as those taken at the time of vehicle manufacture. Therefore, measurements may be made at multiple orientations on the vertical panel; for example, at three, six, nine, and twelve o'clock.

When a vehicle arrives at a paint repair center, it is first determined if the required repair is on a horizontal surface (e.g., a hood) or a vertical surface (e.g. a door panel). This will enable the operator to properly orient the color measuring device on the vehicle and take the necessary measurements (i.e., at least a single measurement on a substantially horizontal surface and at least two measurements on a substantially vertical surface). After the color and orientation data are obtained, the database may be searched to find a color formula that best matches the color of the vehicle.

Figure 2:
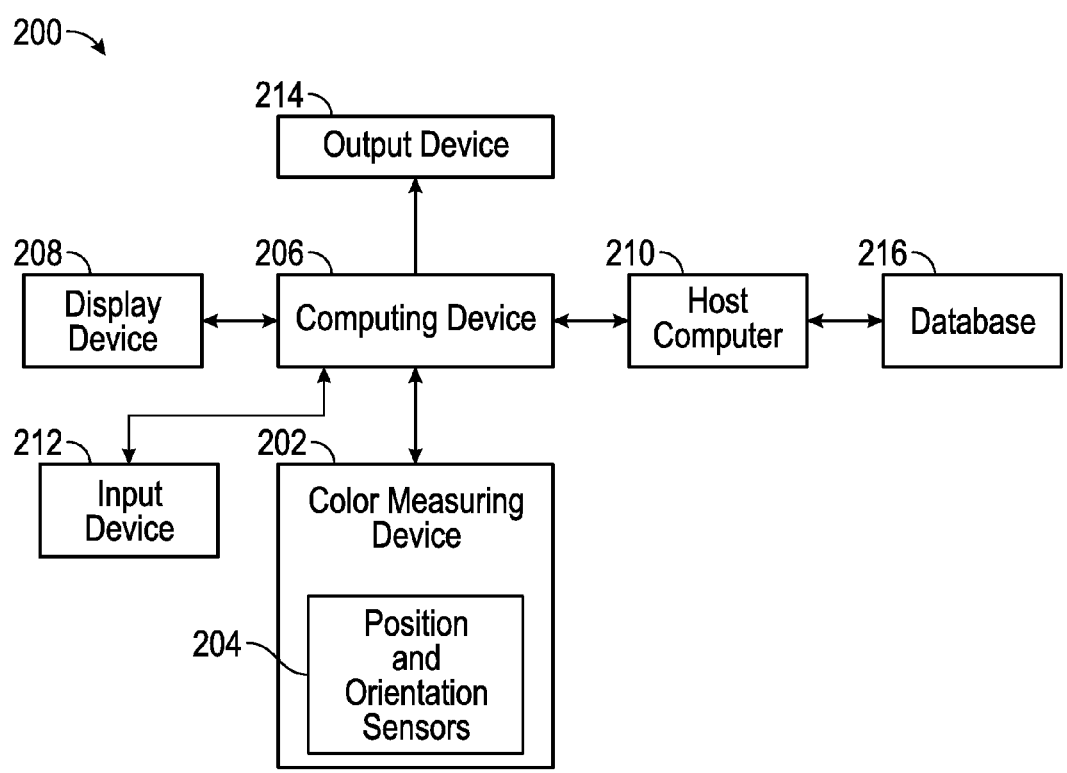
FIG. 2 is a block diagram of a system for deriving a matching paint formula to effectuate a repair in accordance with an exemplary embodiment.
Figure 3:
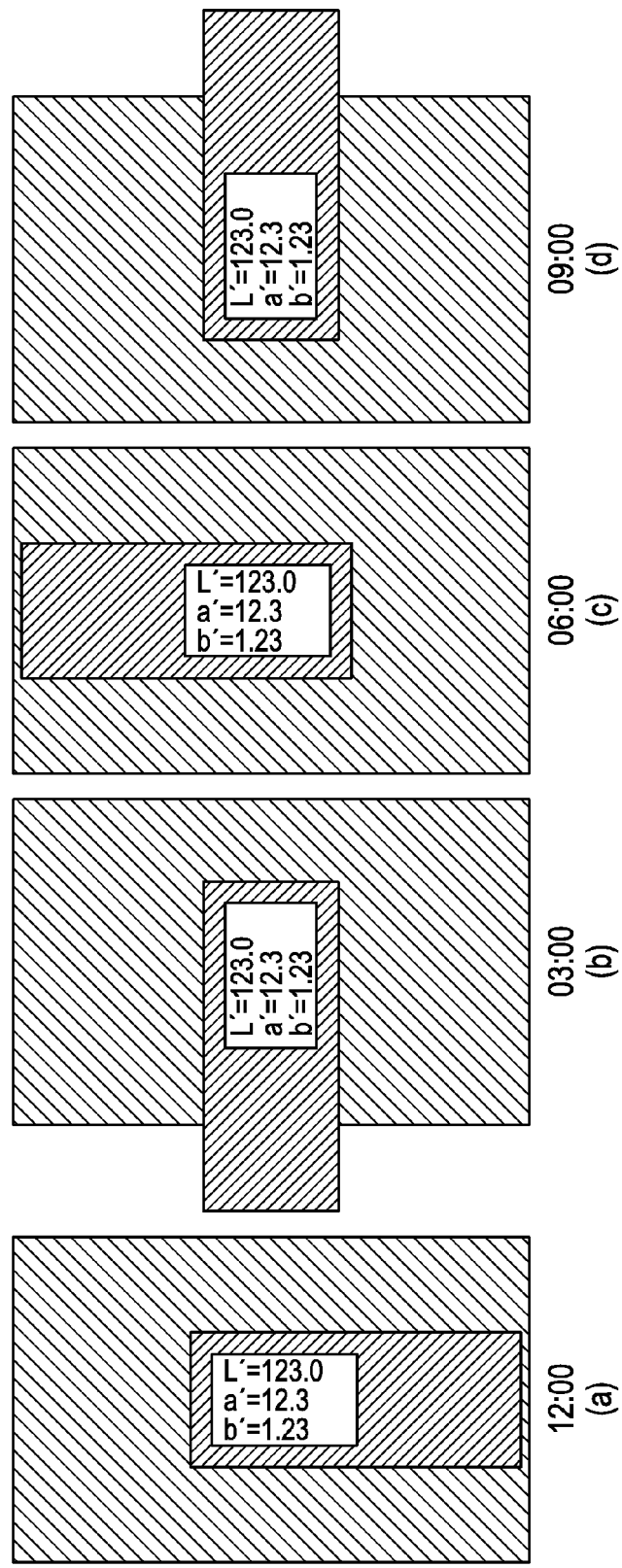
FIG. 3 is a plan view illustrating the color measurement of a directional panel using different orientations of a color measuring device such as a spectrophotometer in accordance with an embodiment.

FIG. 2 is an exemplary block diagram of a system 200 for measuring color using a color measuring device 202 that includes position and orientation sensors 204 in accordance with an exemplary embodiment. The system includes a color measuring device 202 such as a spectrophotometer of the type described above, a goniospectrophotometer, a colorimeter, or the like, which includes orientation and, optionally, location sensors for determining position in an X, Y, Z coordinate system and roll, pitch, and yaw orientation. For example, roll, pitch, and yaw may be determined by an orientation sensor such as an ADX335 Small Low Power, 3-axis+3G Accelerometer available from Analog Devices. Also, a Polhemus Fastrack 6-degrees-of-freedom electromagnetic motion tracker senses position in an X, Y, Z coordinate system as well as roll, pitch, and yaw orientation.

Referring still to FIG. 2, system 200 also comprises a computing device 206 coupled to color measuring device 202 and position and orientation sensors 204, a display device 208, a host computer 210, an input device 212, and an output device 214. Host computer 210 is coupled to database 216. Any goniospectrophotometer, such as Model MA68II manufactured by X-Rite, Grandville, Mich., or the BYK mac-I manufactured by BYK Gardner, Columbia, Md. can be used. It should be noted that database 216 may be included in host computer 210 or in computing device 206.

The data input device 212 can be selected from a digital input device, such as a wired keyboard, a wireless keyboard, a digital writing pad, a touch screen, an input portal that can be connected to an electrical device or another computer, or any other digital devices that can input data into the computing device; an optical input device, such as a barcode reader, a scanner, a digital camera, a digital video camera, or any other optical devices that can input data into the computing device; an electromagnetic input device, such as a radio receiver, an RFID (radio frequency identification) receiver, an infrared data receiver, or any other devices that can receive data through a broad range of electromagnetic wavelengths; or a combination thereof. Each of the data input devices may further require necessary adaptors or couplings in order to input data into the computing device, wherein those adaptors or couplings can be readily determined by those skilled in the art. Those adaptors or couplings can further be wired or wireless.

The display device 208 can be selected from a digital display device, such as a computer monitor screen, a PDA, a computer, a cell phone, a smart phone, or a TV; an optical display device, such as a projector; a print display, such as a printer; or a combination thereof. The display device can also be a duel functional display/data input device. One example of such duel functional device is a touch screen of a computer or a PDA.

The output device 214 can be a printer, a monitor screen or a data output portal that can output data such as selected formulas. The output device 214 can be further coupled to other computing devices or databases or a mixing device that can mix coating compositions according to the selected formulas that are stored in database 216. The input device 212, the output device 214, and the color measuring device 202 can be functionally connected to the computing device 206 through wired or wireless connections. The computing device 206 can have database 216 loaded into its storage such as a hard drive or a memory card of the computing device 206. The database 216 can also be accessed from the computing device 206 through wired or wireless connections.

The computing device 206 can be configured to generate and display on display device 208 realistic matching images based on the individual matching images and the target image. The matching images or the target image can be displayed at one or more pre-determined aspecular angles. Simulated individual blending images based on the target image and each of the individual matching images can also be generated and displayed.

In accordance with an exemplary embodiment, FIGS. 3(a), 3(b), 3(c), and 3(d) illustrates a color measuring device 302 (e.g., a goniospectrophotometer) positioned for measuring the color of a directional panel 304 at a plurality of orientations; e.g. substantially 12:00, 03:00, 06:00, and 09:00 o'clock, respectively. This may be done at the time of OEM manufacture, and the resulting color data is stored in a database (216 in FIG. 2) in association with vehicle identification data such as model year, make, model, color, VIN number, etc. This data will be made available should a subsequent paint repair become necessary. Alternatively, this may be done at the time of initial paint formulation by a paint manufacturer.

Figure 4:
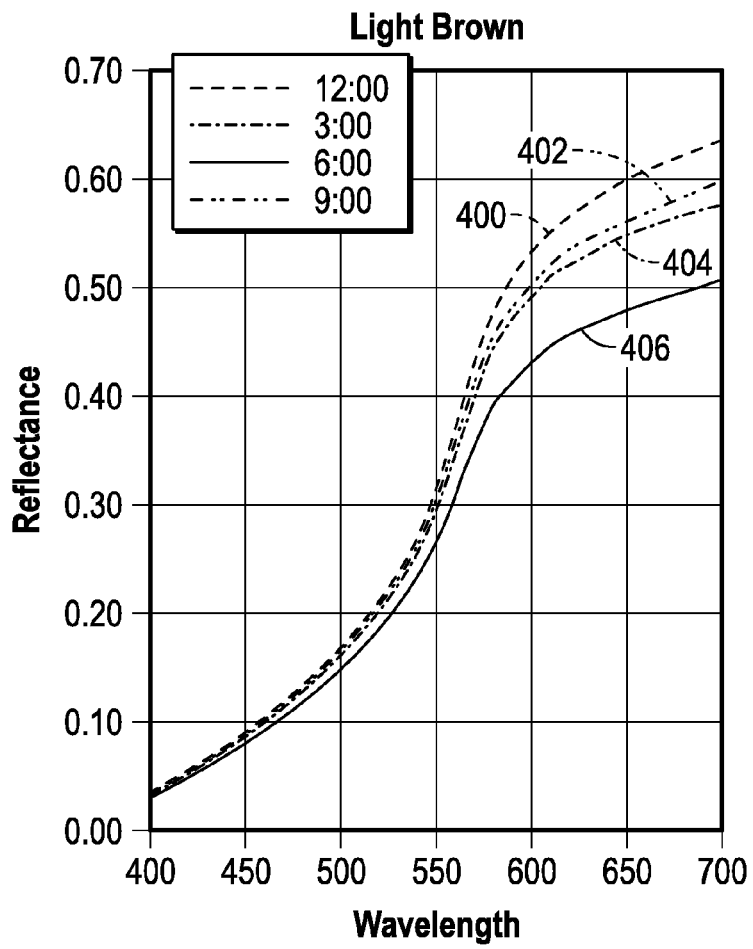
FIG. 4 is a diagram illustrating the wavelength vs. reflectance characteristics for a light brown coating at the measuring orientations shown in FIG. 4.

FIG. 4 illustrates the relationships 400, 402, 404, and of 406 of wavelength vs. reflectance for the measurement of a directional light brown panel with a color measurement device oriented at, for example, substantially 12:00, 03:00, 06:00, and 09:00 o'clock, respectively.

Figure 5:
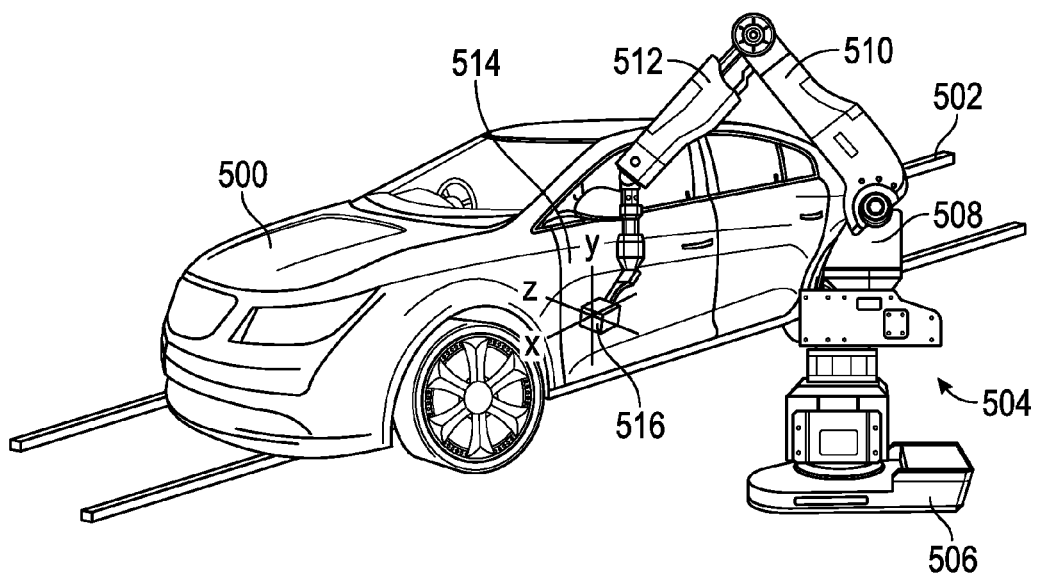
FIG. 5 is an isometric view of an apparatus for measuring and recording color data along with the orientation of the color measurement instrument used (e.g., a goniospectrophotometer) at the time of manufacture in accordance with an exemplary embodiment.

FIG. 5 is an isometric view of an apparatus that measures and records color data and the orientation of the color measurement instrument used (e.g., a goniospectrophotometer) at the time of OEM vehicle manufacture in accordance with an exemplary embodiment. As can be seen, a painted automobile 500 is positioned on an automobile assembly line 502 at a location where it may remain stationary for the length of time it takes to take the necessary measurements. A robot 504 comprises a base 506 and actuator arms 508, 510, and 512. A goniospectrophotometer 516 including position and orientation sensors (204 in FIG. 2) is fixedly coupled to arm 512 and positioned proximate vertical door panel 514 so as to permit goniospectrophotometer 516 to take color measurements at a plurality of orientations and to provide the data, associated orientations, and position data to a database (216 in FIG. 2) as metadata for later use. Accelerometers or other orientation sensors in the goniospectrophotometer record its original three-dimensional orientation (i.e. roll, pitch, and yaw) so that an accurate paint formula can be determined and utilized at a later time for repair. Thus, the instrument being used to measure the color resides in a fixed position on an assembly line so that instrument orientation and position (X, Y, Z) relative to the assembly line can be used to confirm the location on the vehicle where the measurement was made method.

Figure 6:
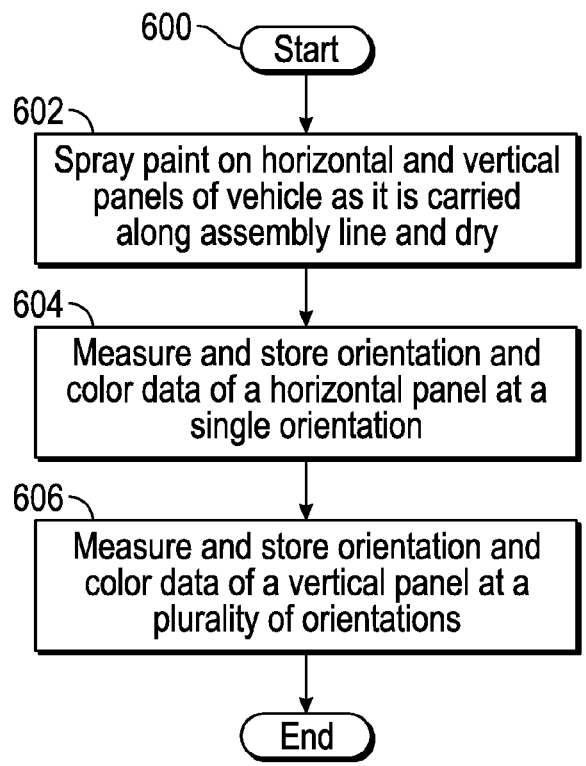
FIG. 6 is a flowchart illustrating a method for measuring and storing color data along with the orientation of the color measurement instrument used (e.g., a goniospectrophotometer) at the time of OEM manufacture in accordance with an exemplary embodiment.

FIG. 6 is a flow chart illustrating a method 600 for measuring and recording color data along with orientation and position data of the color measurement instrument used (e.g., a goniospectrophotometer) at the time of OEM manufacture and measurement in accordance with an exemplary embodiment. First, a smooth layer of paint is sprayed on both vertically and horizontally oriented panels as they are carried along an assembly line to produce directional and isotropic samples (STEP 602). After drying, the color coordinates of the horizontal sample are measured and stored (STEP 604). Since gravity is not a factor in the case of a horizontal sample, only a single measurement orientation is required to obtain a substantially uniform measurement. However as stated previously, in the case of a vertical (i.e. directional) sample, gravity may result in different color measurements at different locations; therefore, multiple measurements are necessary. For example, measurements should be taken at least at two orientations; e.g., at substantially 12:00 o'clock and 06:00 o'clock relative to the top of the vertical sample when sprayed. Preferably, measurements are taken at four orientations; e.g., at substantially 12:00, 03:00, 06:00, and 09:00 o'clock relative to the top of the vertical sample (STEP 606). Once again, the measurement data is stored in a database along with the corresponding vehicle identification data.

Figure 7:
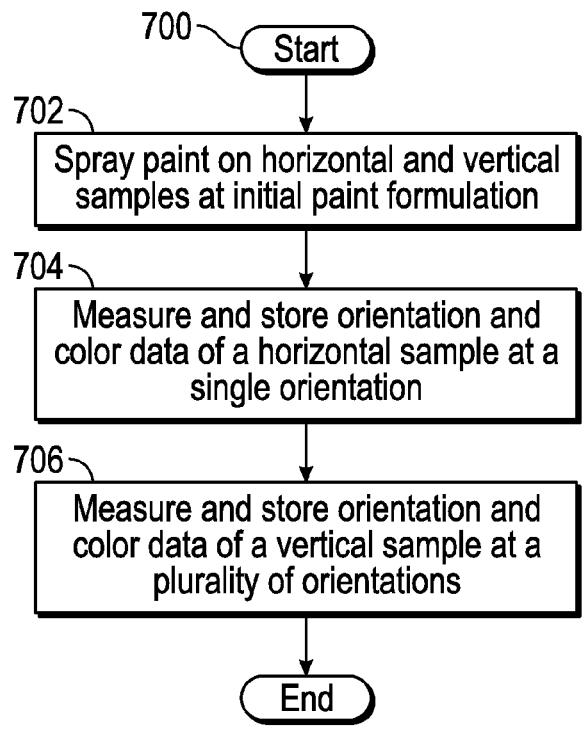
FIG. 7 is a flowchart illustrating a method for measuring and storing the average color and orientation data of a painted surface at the time of initial paint formulation by a paint manufacturer in accordance with an exemplary embodiment.

FIG. 7 is a flowchart illustrating a method 700 for measuring and storing the average color and orientation of a painted standard (also hereinafter referred to as a "sample") at the time of initial paint formulation by a paint manufacturer in accordance with an exemplary embodiment. First, a smooth layer of paint is produced on both vertically and horizontally oriented panels to produce directional and isotropic samples (STEP 702). As was the case previously, the color coordinates of the horizontal sample are measured and stored (STEP 704). Only a single measurement orientation is required to obtain a substantially uniform measurement of a horizontal sample. However as stated previously, in the case of a vertical sample, multiple measurements are necessary. Thus, measurements should be taken at least at two orienations (e.g., substantially at 12:00 o'clock and 06:00 o'clock) relative to the top of the vertical sample and preferably at four orientations (e.g., substantially at 12:00, 03:00, 06:00, and 09:00 o'clock) relative to the top of the vertical sample. Once again, the measurement data is stored in a database.

Figure 8:
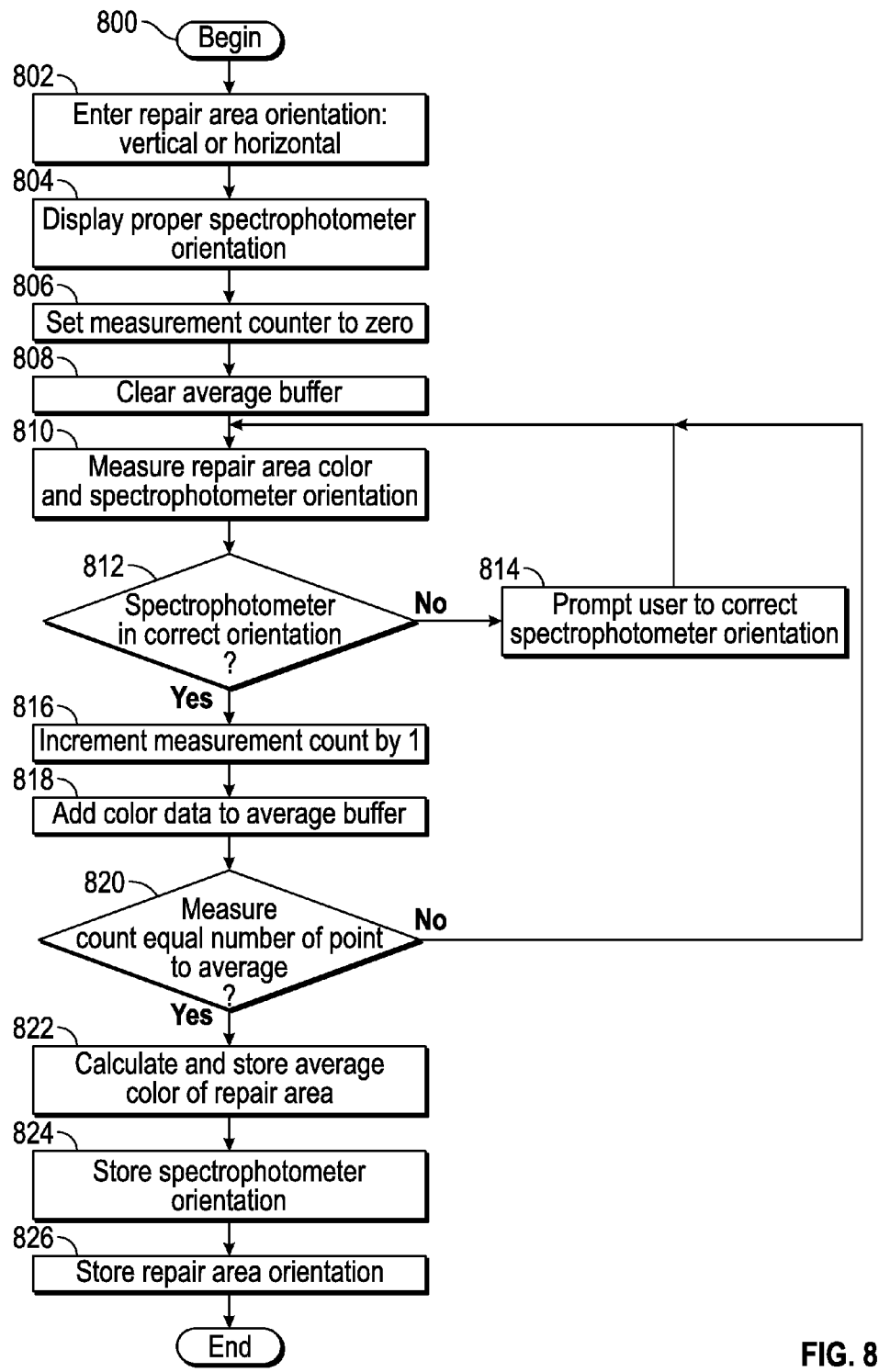
FIG. 8 is a flowchart illustrating a method for measuring and storing the average color and orientation data of a painted surface at the time of repair at a paint repair in accordance with an exemplary embodiment.

As stated previously, in order to measure and store the average color and orientation of a repair area and choose among alternate formulas in a database, it is necessary to know how the color measuring device (e.g. a goniospectrophotometer) was oriented at the time of measurement by an OEM or paint manufacturer, as the case may be, especially when doing a vertical repair. To this end, FIG. 8 is a flowchart illustrating a method 800 for measuring and storing the average color and orientation data of a painted surface at the time of repair at a paint repair center in accordance with an exemplary embodiment. First, it must be determined if a potential repair area is vertical or horizontal (STEP 802) in FIG. 8. Next, in STEP 804, the orientations of the color measurement instrument are displayed. As stated previously, there are typically one horizontal orientation and preferably two to four vertical orientations.

To determine an average repair color or formula, a measurement counter is set to zero (STEP 806, and an average buffer is cleared (STEP 808). Next, the color data associated with the repair area and the position of the goniospectrophotometer are compared to the position previously stored in the database at the time of manufacture or initial paint formulation as described above (STEP 810). If the goniospectrophotometer was not properly positioned (STEP 812), the user is prompted to correct the orientation (STEP 814). If the orientation is correct, the measurement counter is incremented my one (STEP 816) and the color data is added to an average buffer (STEP 818). If the measurement counter has not reached a predetermined value (e.g., three) (STEP 820), STEPS 810-820 are repeated until the measurement counter reaches the predetermined value.

After the measurement counter reaches the predetermined value, the color data samples are averaged, and the average value is stored in database 216 (STEP 822). The goniospectrophotometer orientation and the repair area orientation are both stored (STEPS 824) and STEP 826).

Figure 9:
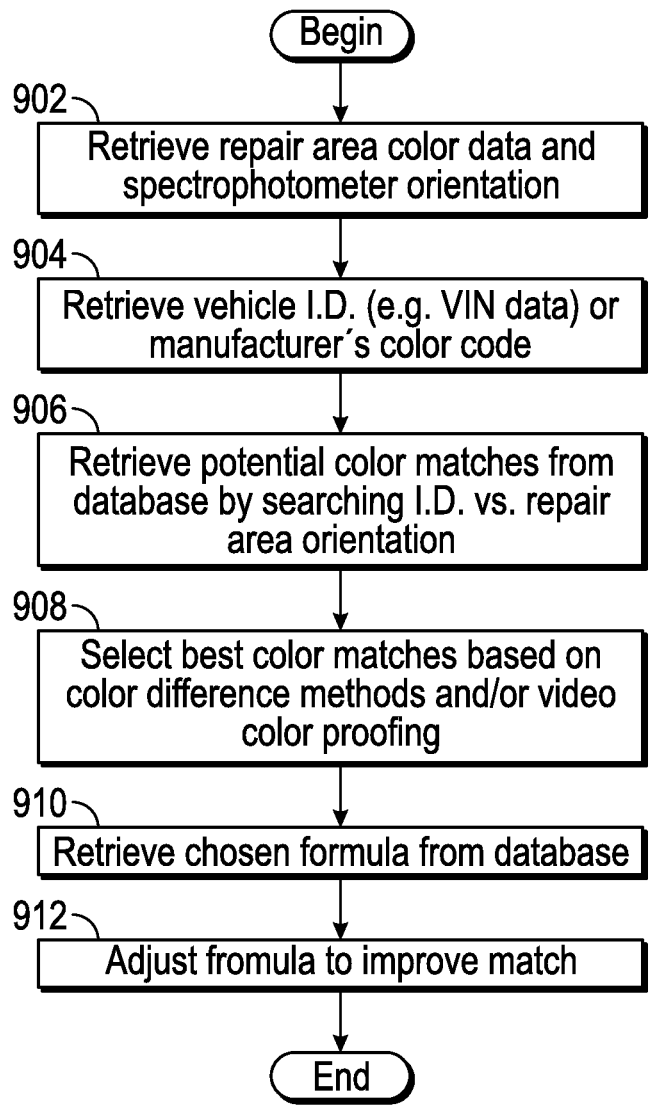
FIG. 9 is a flowchart illustrating a method for retrieving the optimum color formula to be used for repair in accordance with an exemplary embodiment.

FIG. 9 is a flow chart of a process 900 for retrieving the best color from the database (216 in FIG. 2) for a repair in accordance with an exemplary embodiment. In STEP 902, the repair area color data and spectrophotometer orientation are retrieved. In STEP 904, the vehicle identification data (e.g., VIN) or paint manufacturer's color code is retrieved from the database. Potential color matches are retrieved from the database by searching the identification data\manufacturer's code vs. repair area orientation (STEP 906). Next, the best color matches are chosen based on color and appearance difference metrics and/or video color proofing (STEP 908), and a chosen formula is retrieved from the database (STEP 910). Finally, if desired or necessary, the formula retrieved from the database may be further adjusted to improve the quality of the match (STEP 912).

Thus, there has been provided a system and method for recording color data and orientation of a color measurement instrument such as a goniospectrophotometer and include this data as metadata to the color measurement data for later use. There is also provided the ability to utilize accelerometers or other orientation sensors in the goniospectrophotometer to record its original three-dimensional orientation (i.e. roll, pitch, and yaw) so that an accurate paint formula can be determined and utilized at a later time for repair. It has also been proposed to position the instrument, that is being used to measure the color of a vehicle, in a fixed position on an assembly line as so that the instrument orientation and its position (X, Y, Z) relative to the assembly line can be used to confirm the location on the vehicle where the measurement was made.

The foregoing exemplary embodiment was described above in the context of a fully functioning computer system; however, those skilled in the art will recognize that the mechanisms are capable of being distributed as a program product and, furthermore, that the teachings apply to the program product regardless of the particular type of computer-readable media (e.g., floppy disc, hard drive, memory card, optical disc, etc.) employed to carry-out its distribution.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the in any way. Rather, the foregoing Detailed Description will provide those skilled in the art with a convenient road map for implementing an exemplary embodiment, it being understood that various changes may be made in the function and arrangement of elements described.

The invention claimed is:

1. A method for measuring and storing vehicular paint color data, comprising:

measuring the color of a directional sample, wherein the directional sample is a vehicle body component positioned in a vertical orientation with respect to the vehicle that has effect pigment flakes that have an anisotropic orientation, with a color measuring device at a plurality of orientations, wherein the plurality of orientations comprise a first orientation, a second orientation separated from the first orientation by 90 degrees clockwise in a rotational plane, a third orientation separated from the second orientation by 90 degrees clockwise in the rotational plane, and a fourth orientation separated from the third orientation by 90 degrees clockwise in the rotational plane;

measuring the color of a non-directional sample, wherein the non-directional sample is a vehicle body component positioned in a horizontal orientation with respect to the vehicle that has effect pigment flakes that have an isotropic orientation, with the color measuring device at a single orientation; and storing color and orientation data in a database, wherein the color and orientation data comprises the measured color of the directional sample at each of the first through four orientations along with roll-pitch-yaw orientation and X,Y,Z position of the color measuring device at each orientation, and wherein the color and orientation data comprises the measured color of the non-directional sample at the single orientation along with roll-pitch-yaw orientation and X,Y,Z position of the color measuring device at the single orientation.

2. The method of claim 1 further comprising averaging a number of measurements at each of the first through fourth orientations.

3. The method of claim 1 wherein the color and orientation data is measured and stored at the time of vehicle manufacture by an OEM.

4. The method of claim 3 further comprising determining and storing vehicle identification data in the database.

5. The method of claim 1 wherein the color and orientation data is measured and stored at the time of initial paint formulation.

6. The method of claim 1 further comprising:
measuring color at a paint repair center;
providing the color data and orientation data to a processor; and
searching a database to retrieve substantially matching paint formulas.

* * * * *